United States Patent [19]
Weaver et al.

[11] Patent Number: 5,727,033
[45] Date of Patent: Mar. 10, 1998

[54] SYMBOL ERROR BASED POWER CONTROL FOR MOBILE TELECOMMUNICATION SYSTEM

[75] Inventors: Carl Francis Weaver, Hanover Township, Morris County; Wei-Chung Peng, East Hanover, both of N.J.

[73] Assignee: Lucent Technologies Inc., Murray Hill, N.J.

[21] Appl. No.: 346,800

[22] Filed: Nov. 30, 1994

[51] Int. Cl.[6] ........................................... H04L 7/00
[52] U.S. Cl. ................................. 375/358; 455/69
[58] Field of Search ........................... 375/200, 205, 375/358; 455/38.3, 69, 33.1; 379/59, 58

[56] References Cited

U.S. PATENT DOCUMENTS

| | | | |
|---|---|---|---|
| 4,309,771 | 1/1982 | Wilkens | 375/58 |
| 5,056,109 | 10/1991 | Gilhousen et al. | 375/200 |
| 5,257,283 | 10/1993 | Gilhousen et al. | 375/290 |
| 5,265,119 | 11/1993 | Gilhousen et al. | 375/200 |
| 5,267,262 | 11/1993 | Wheatley, III | 375/200 |
| 5,299,226 | 3/1994 | Schilling | 375/200 |
| 5,333,175 | 7/1994 | Ariyavisitakul et al. | 379/58 |
| 5,386,588 | 1/1995 | Yasuda | 455/69 |

FOREIGN PATENT DOCUMENTS 0 548 939 A2  6/1993  European Pat. Off. .

OTHER PUBLICATIONS

"Power Control in CDMA" and Power Control the CDMA Network Engineering Handbook vol. 1 Nov. 23, 1992.

Primary Examiner—Temesghen Ghebretinsae

[57] ABSTRACT

A mobile telecommunication system power control loop includes a symbol error rate detector to detect a number of symbol errors induced during transmission, a summing node to subtract the output of the symbol error rate detector from a symbol error rate target, a multiplier to introduce an adjustment factor, and an integration element to sum the output of the multiplier with past outputs of the multiplier. The output of the integration element is a signal power to noise power ratio target which is used to control the transmission power of the mobile telecommunication system. In one embodiment the symbol error rate target is a constant or parameter set by the user. In another embodiment the symbol error rate target is adjusted automatically to maintain a constant frame error rate.

15 Claims, 3 Drawing Sheets

SYMBOL ERROR BASED POWER CONTROL FOR MOBILE TELECOMMUNICATION SYSTEM

BACKGROUND OF THE INVENTION

1. Field of the Invention

The present invention relates generally to telecommunication systems. More particularly, the present invention is directed to a system and method for controlling transmitter power based on symbol errors.

2. Related Art

Code Division Multiple Access (CDMA) is a form of modulation used in telecommunication systems. In CDMA, digital information is encoded in expanded bandwidth format and signals are transmitted simultaneously within the same bandwidth. Mutual interference between signals is reduced by spreading gain and orthogonality between unique codes used for each signal. CDMA permits a high degree of energy dispersion in the emitted bandwidth.

In CDMA systems, the number of signals which can be transmitted simultaneously is limited by the total power of the transmitted signals. Thus, reducing the power of the Signals increases the capacity of the telecommunication system. However, reducing the power of a signal increases the error rate of that signal. To maintain minimum power for a given error rate, telecommunication systems employ power control loops.

A typical mobile cellular telecommunication system power control loop varies the power output of the mobile station to maintain a constant frame error rate at the base station. Frame error rate is the number of frame errors divided by the total number of frames observed. A frame error occurs when one or more bit errors occur in a frame of bits. Frame errors are detected after error correction. A frame error rate target is selected to minimize power without compromising signal quality. If the frame error rate exceeds the frame error rate target, the usefulness of the signal is reduced and the power output level of the mobile station is increased to decrease the number of frame errors. If the frame error rate is below the frame error rate target, the power output level of the mobile station exceeds the optimum power output level, and the power output level of the mobile station is reduced.

A typical frame error rate target for a power control loop is 1%. To develop a confidence level in the frame error rate estimation and control, several frame errors must be observed. Because frame errors occur approximately once out of every 100 frames (assuming the frame error rate target is 1%) and several frame errors are required to develop a confidence factor, the power output level target for the mobile station may only be adjusted once every several hundred frames. During this several hundred frame period, the propagation losses between the mobile and the base station can vary due to movement of the mobile station and interference. This propagation loss variation causes the received power variation in the base station. To accommodate this variable power loss, the mobile station must increase its power output level so that the power loss variations do not decrease the power level at the base station below the minimum level required for the target error rate. As discussed above, the capacity of a CDMA system is determined by the total power of the transmitted signals. Thus, the increased power level to accommodate varying power loss between adjustments decreases the capacity of the telecommunication system.

What is needed is a power control loop for a mobile cellular telecommunication system capable of more tightly controlling the power output level of a mobile station to provide the required signal quality at the base station.

SUMMARY OF THE INVENTION

The present invention is a mobile cellular telecommunication system power control loop which utilizes symbol error rate detection. In the present invention, the power output level of a mobile station is adjusted for a constant symbol error rate. Each frame of data transmitted via the mobile cellular telecommunication system comprises a plurality of symbols. Symbol errors are detected prior to error correction of the data. Because of the quantity of symbols and the detection of symbol errors occurs prior to error correction, the quantity of symbol errors is significantly higher than the number of frame errors. This allows a given confidence level to be achieved faster with symbol error rate based control than with frame error rate control. Therefore, the power output of the system can be either updated more often or the power control step size can be adjusted more precisely. This enables the power control loop to more closely track the optimum power output level of the mobile station.

A more tightly controlled power output level reduces variations in power loss. Reducing variations in power loss permits the system to reduce the marginal power output required to offset power loss variations. Reducing the marginal power output reduces the power of the signal, which increases the capacity of the telecommunication system.

The present invention includes a symbol error rate detector to detect a number of symbol errors induced on a transmitted signal and a summing node to subtract the symbol error rate from a symbol error rate target. The output of the summing node is called a symbol error rate error. An integration element sums the symbol error rate errors to determine a signal power to noise power ratio target for the mobile cellular telecommunication system. The power output level of the mobile station is adjusted to maintain the signal power to noise power ratio at the base station equal to the signal power to noise power ratio target. Symbol error rate detection updates the signal power to noise power ratio target faster than in a conventional CDMA cellular system. Therefore, tighter control of the power output of the mobile station is achieved.

DETAILED DESCRIPTION OF THE PREFERRED EMBODIMENTS

A preferred embodiment of the present invention is discussed below. While specific part numbers and configurations are discussed, it should be understood that this is done for illustration purposes only. Having the benefit of this disclosure, it will become apparent to a person skilled in the relevant art that other components and configurations may be used without parting from the spirit and scope of the invention.

The preferred embodiment of the present invention is now described with reference to the figures where like reference numbers indicate like elements. In addition, the left-most digit of each reference number indicates the figure in which the number is first used.

Figure 1:
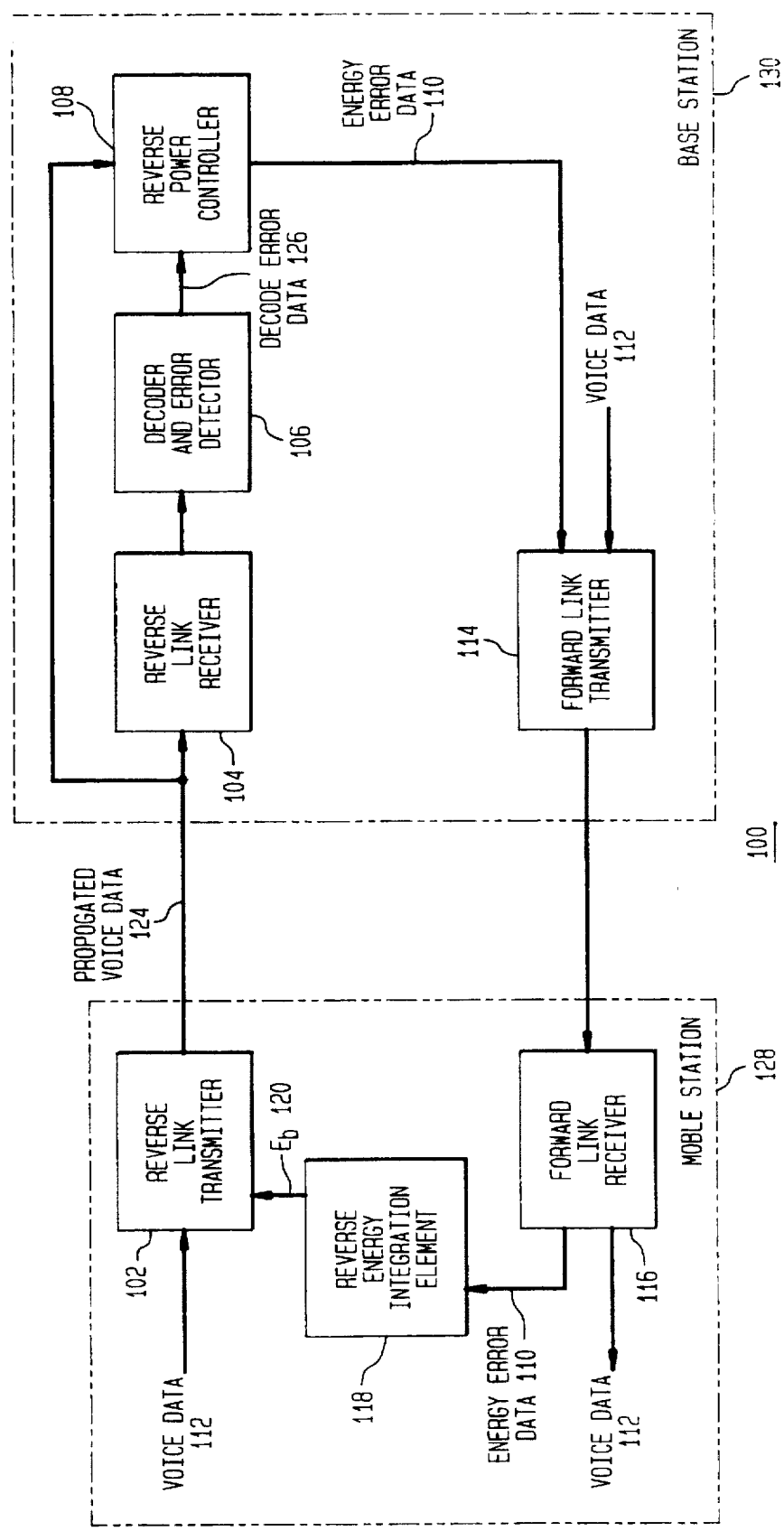
FIG. 1 is a block diagram of a reverse link of a mobile cellular telecommunications system in accordance with a preferred embodiment of the present invention.

FIG. 1 is a mobile cellular telecommunication system 100 according to a preferred embodiment of the present invention. Mobile cellular telecommunication system 100 includes at least one mobile station 128 and at least one base station 130. Mobile station 128 includes a reverse link transmitter 102, a forward link receiver 116, and a reverse energy integration element 118. Base station 130 includes a reverse link receiver 104, a decoder and error detector 106, a reverse power controller 108, a forward link transmitter 114.

Reverse link transmitter 102 in mobile station 128 receives voice data 122 and transmits the voice data in the form of propagated voice data 124. Propagated voice data 124 is received by reverse link receiver 104 and reverse power controller 108 in base station 130. The received data is decoded and error detected via decoder and error detector 106. Reverse power controller 108 receives decode error data 126 from decoder and error detector 106. Reverse power controller 108 outputs energy error data 110. The operation of reverse loop power controller 108 is discussed in detail below with reference to FIG. 2.

Forward link transmitter 114 of base station 130 receives energy error data 110 from reverse power control loop 108, and voice data 112. Forward link transmitter 114 transmits energy error data 110 and voice data 112 to forward link receiver 116. Forward link receiver 116 sends energy error data 110 to reverse energy integration element 118. Reverse energy integration element 118 sums energy error data 110 with past energy error data to determine the optimum transmit energy per bit (Eb) 120. Eb 120 is provided to reverse link transmitter 102 to set the output power level of reverse link transmitter 102.

As would be apparent to a person skilled in the relevant art, a similar system can be used to Control the power output level of forward link transmitter 114.

Reverse power controller 108 monitors decode error data 126 and the ratio of energy per bit to noise spectral density (Eb/No) of propagated voice data 124 received by a base station 130. Reverse power controller 108 outputs energy error data 110 which is integrated at a mobile station 128 to determine the optimum transmit energy per bit (Eb) 120 of reverse link transmitter 102.

Figure 2:
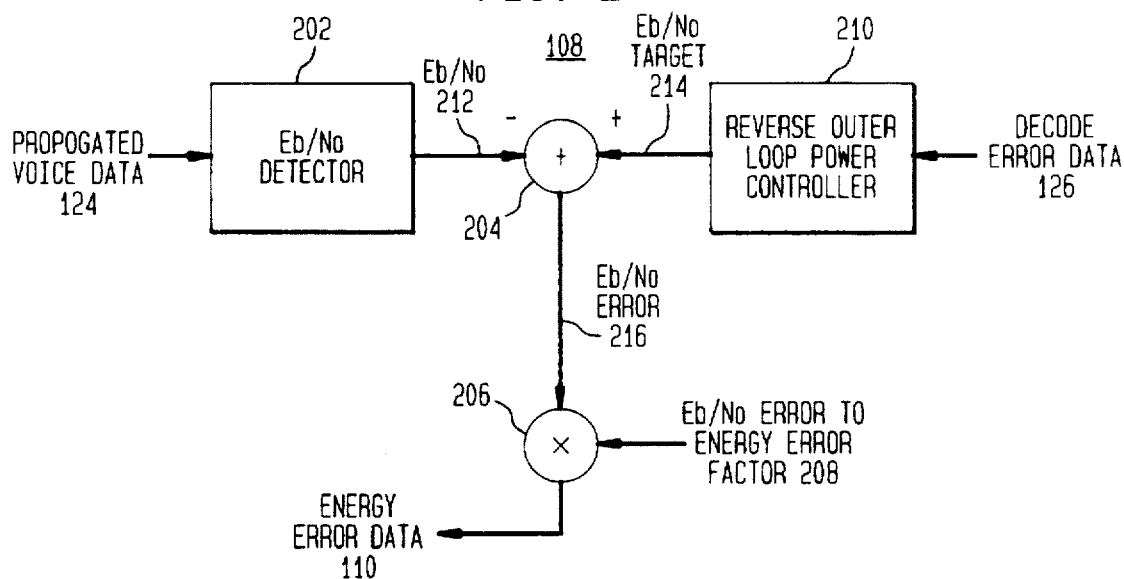
FIG. 2 is a block diagram of a reverse power controller in accordance with a preferred embodiment of the present invention.

FIG. 2 is a block diagram of reverse power controller 108 in accordance with a preferred embodiment of the present invention. Reverse power controller 108 includes an Eb/No detector 202, a summing junction 204, a multiplier 206, and a reverse outer loop power controller 210.

Reverse power controller 108 includes two power control loops: an inner control loop and an outer control loop. The outer control loop, controlled by reverse outer loop power controller 210, sets an Eb/No target 214. The operation of reverse outer loop power controller 210 is discussed in detail below with reference to FIGS. 3 and 4. The inner control loop detects the Eb/No of propagated voice data 124 and adjust the power output level of reverse link transmitter 102 to increase or decrease the Eb/No of propagated voice data 124 to match Eb/No target 214. The inner control loop controls the Eb/No of propagated voice data 124 by adjusting energy error data 110. Energy data 110 adjusts Eb 120 of reverse link transmitter 102. Increasing/decreasing Eb 120 increases/decreases the energy of propagated voice data 124 thereby increasing/decreasing the Eb/No of propagate voice data 124.

Eb/No detector 202 determines the Eb/No 212 of propagated voice data 124. Reverse outer loop power controller 210 determines an Eb/No target 214 from decode errors 126. Summing node 204 outputs the difference of Eb/No target 214 and Eb/No 212. The output of summing node 204, called Eb/No error 216, is multiplied by Eb/No error to energy error factor 208 via multiplier 206. The output of multiplier 206 is energy error data 110. As discussed above, energy error data is propagated to mobile station 128 where it is integrated via reverse energy integration element 118 to determine Eb 120 which sets the transmit energy per bit of reverse link transmitter 102.

Figure 3:
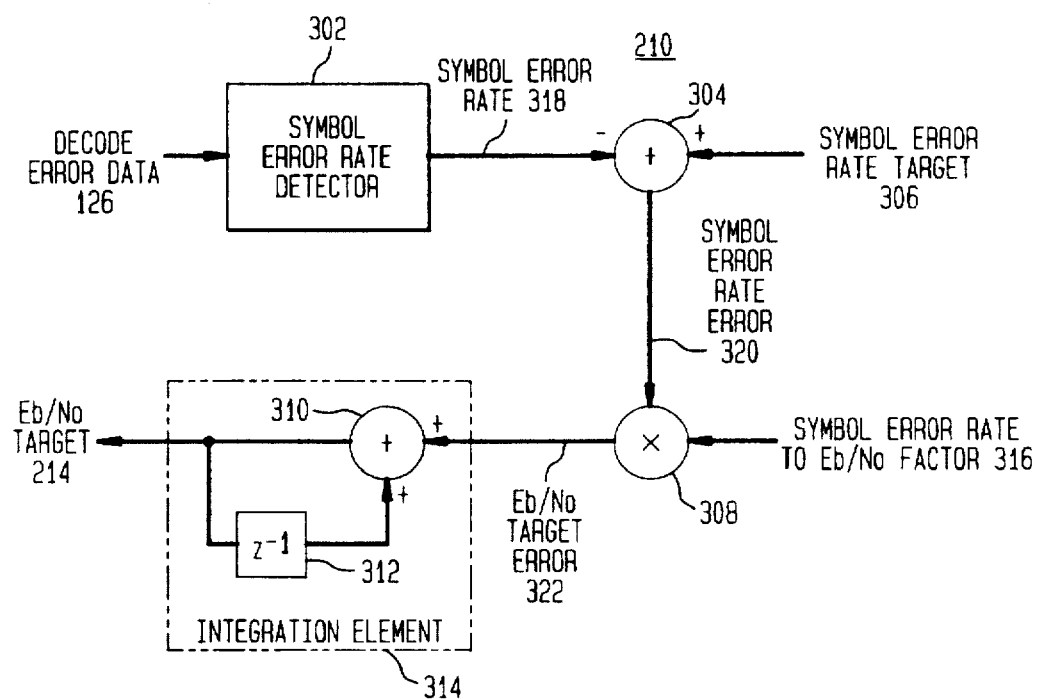
FIG. 3 is a block diagram of a reverse outer loop power controller utilizing symbol error detection in accordance with a preferred embodiment of the present invention.

FIG. 3 is a block diagram of a reverse outer loop power controller 210 utilizing symbol error detection in accordance with a preferred embodiment of the present invention. Reverse outer loop power controller 210 includes a symbol error rate detector 302, a summing node 304, a multiplier 308, and an integration element 314. Integration element 314 includes a summing node 310 and a delay element 312.

Reverse outer loop controller 210 sets Eb/No target 214 for the inner control loop described above with reference to FIG. 2. Eb/No target 214 is increased or decreased to maintain a constant symbol error rate target 306. Increasing/decreasing Eb/No target 214 will cause the inner control loop to increase/decrease Eb 120 of reverse link transmitter 102 which will decrease/increase the number of errors per symbol. In a preferred embodiment, symbol error target 306 is a constant or parameter defined by the user. Symbol error rate target 306 is chosen to minimize the power output of the mobile station while taking advantage of the error detection capabilities of the mobile telecommunication system. A typical symbol error rate target is in the range of six to twelve percent.

Symbol error rate detector 302 determines a symbol error rate 318 from decode error data 126. Summing node 304 subtracts symbol error rate 318 from symbol error rate target 306. The output of summing node 304, called symbol error rate error 320, is multiplied by a symbol error rate to Eb/No factor 316 via multiplier 308. The output of multiplier 308, called Eb/No target error 322, is summed by integration element 314 to yield Eb/No target 214. Integration element 314 sums Eb/No target errors 322 by storing the previous sum in delay element 312 and adding the previous sum to Eb/No error target 322 via summing element 310.

Symbol error rate to Eb/No factor 316 is a constant va, lue used to yield a linear approximation of a non-linear relationship. The actual conversion factor should vary slightly depending on the value of Eb/No target 214. However, multiplication by a constant value is done for purposes of simplicity and provides acceptable results. In an alternate embodiment, symbol error rate to Eb/No factor 316 could be generated by using Eb/No target 214 to look up a value in a look-up table. In yet another embodiment, multiplier 308 could be eliminated, and symbol error rate error 320 and Eb/No target 214 could be used to look up an Eb/No target error 322 in a two-dimensional look-up table.

Another preferred embodiment of reverse outer loop power controller 210 utilizes both frame error rate detection and symbol error rate detection to determine Eb/No target 214. In this embodiment, the symbol error rate target is adjusted according to a constant frame error rate. The actual power output level of the mobile unit is still determined from the symbol error rate. However, instead of a constant symbol error rate target, as shown in FIG. 3, the symbol error rate target is adjusted to maintain a constant frame error rate. This embodiment provides the tight power control which results from using symbol error rate detection, but does not require knowledge of the desired symbol error rate target to obtain a given frame error rate. This embodiment also corrects for different relationships between symbol error rate and frame error rate which may occur with differing radio frequency propagation conditions.

Figure 4:
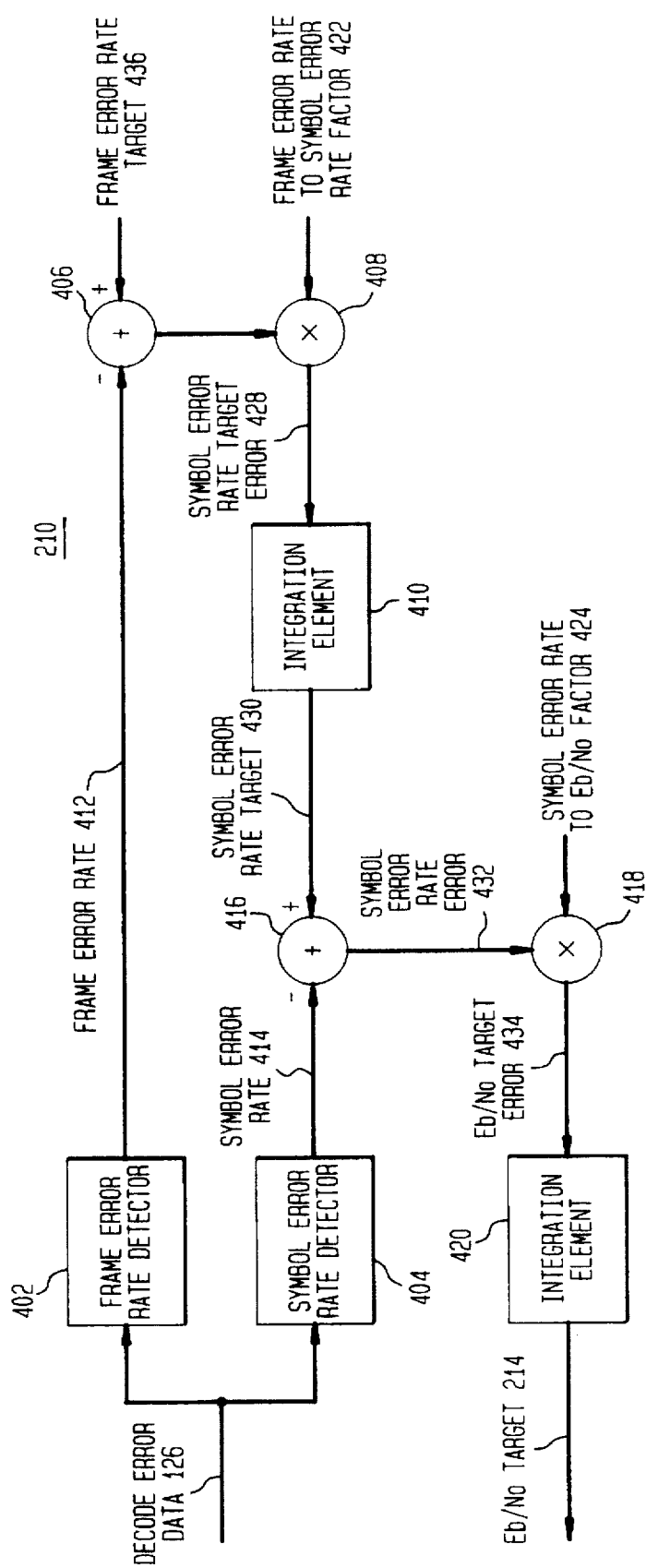
FIG. 4 is a block diagram of a reverse outer loop power controller utilizing symbol error detection and frame error detection in accordance with a preferred embodiment of the present invention.

FIG. 4 is a block diagram of one embodiment of reverse outer loop power controller 210 utilizing symbol error rate detection and frame error rate detection in accordance with a preferred embodiment of the present invention. This embodiment of reverse outer loop power controller 210 includes a frame error rate detector 402, a symbol error rate detector 404, a summing node 406, a multiplier 408, an integration element 410, a summing node 416, a multiplier 418, and an integration element 420.

Frame error rate detector 402 determines frame error rate 412 from decode error data 126. Summing element 406 subtracts frame error rate 412 from a frame error rate target 436. The output of summing node 406, called frame error rate error 426, is multiplied by a frame error rate to symbol error rate factor 422. The output of multiplier 408, called symbol error rate target error 428, is integrated by integration element 410. The output of integration element 410 is symbol error rate target 430.

Symbol error rate detector 404 determines a symbol error rate 414 from decode error data 126. Summing node 416 subtracts symbol error rate 414 from symbol error rate target 430. The output of summing node 416, called symbol error rate error 432, is multiplied by symbol error rate to Eb/No adjustment factor 424 via multiplier 418. The output of multiplier 418, called Eb/No target error 434, is integrated by integration element 420. The output of integration element 420 is Eb/No target 214.

Alternately, the symbol error rate target can be adjusted by using frame error rate sequential adjustment. Sequential adjustment based on frame error rate is described in U.S. Pat. No. 5,257,283 to Gilhousen et al., the full text of which is incorporated herein by reference as if reproduced in full below. In this embodiment, the symbol error rate target is varied each frame based on whether a frame error was detected. If a frame error is detected, the frame error rate target is multiplied by a scaling factor and subtracted from the previous symbol error rate target. If frame error is not detected, the difference of unity and the frame error rate target is multiplied by a scaling factor and added to the previous symbol error rate target.

While this invention has been particularly shown and described with reference to several preferred embodiments thereof, it will be understood by those skilled in the art that various changes in form and details may be made therein without departing from the scope and spirit of the invention as defined in the appended claims. For example, it will be understood that similar symbol error based power control systems can be used in Time Division Multiple Access (TDMA) and other systems employing digital modulation. Additionally, it would be apparent that similar symbol based power control systems can be used in forward (downlink) or reverse (uplink) telecommunication links.

What is claimed is:

1. A telecommunication system comprising:

a transmitter to transmit a data signal;

a receiver to receive said data signal; and a control loop to control a power output level of said transmitter based on a detection of a symbol error rate of said data signal, wherein said control loop comprises a symbol error rate detector for detecting a number of symbol errors of said data signal and for outputting a symbol error rate, a summing node for determining a difference between said symbol error rate and a symbol error rate target to produce a symbol error rate error, an integration element to integrate said symbol error rate error to produce a signal power to noise power ratio target, and controlling means for controlling the power output level of the transmitter based on said signal power to noise power ratio target.

2. The telecommunication system of claim 1, wherein said controlling means comprises:

a signal power to noise power detector to detect a signal power to noise power ratio of said data signal;

a second summing node for determining a difference between said signal power to noise power ratio and said signal power to noise power ratio target to produce a signal power to noise power ratio error; and a second integration element to integrate a product of said signal power to noise power ratio error, an output of said second integration element controlling the power output level of the transmitter.

3. The telecommunication system of claim 2, further comprising a multiplier, positioned between said second summing node and said second integration element, for multiplying said signal power to noise power ratio error by an energy error factor.

4. The telecommunication system of claim 1, further comprising adjusting said symbol error rate target based on a frame error detection, wherein said frame error detection comprises:

a frame error rate detector for detecting a number of frame errors of said data signal and for outputting a frame error rate;

a second summing node for determining a difference between said frame error rate and a frame error rate target to produce a frame error rate error;

a multiplier for multiplying said frame error rate error by a frame error rate to symbol error rate factor to produce a symbol error rate target error; and an other integration element to integrate said symbol error rate target error to produce said symbol error rate target.

5. A control loop for controlling a power output level of a transmitter of a telecommunication system, comprising:

a symbol error rate detector for detecting a number of symbol errors of a transmitted signal and for outputting a symbol error rate;

a summing node for determining a difference between said symbol error rate and a symbol error rate target to produce a symbol error rate error;

an integration element to integrate said symbol error rate error to produce a signal power to noise power ratio target; and controlling means for controlling the power output level of the transmitter based on said signal power to noise power ratio target.

6. The control loop of claim 5, further comprising a multiplier, positioned between said summing node and said integration element, for multiplying said symbol error rate error by a signal power to noise power ratio conversion factor.

7. The control loop of claim 5, wherein said means for controlling the power output level comprises:

a signal power to noise power detector to detect a signal power to noise power ratio of said transmitted signal;

a second summing node for determining a difference between said signal power to noise power ratio and said signal power to noise power ratio target to produce a signal power to noise power ratio error; and a second integration element to integrate a product of said signal power to noise power ratio error, an output of said second integration element controlling the power output level of the transmitter.

8. The power control loop of claim 7, further comprising a multiplier, positioned between said second summing node and said second integration element, for multiplying said signal power to noise power ratio error by an energy error factor.

9. The control loop of claim 4, further comprising a frame error rate detector for determining a frame error rate for adjusting said symbol error rate target.

10. The control loop of claim 5, further comprising adjusting said symbol error rate target based on a frame error detection, wherein said frame error detection comprises:

a frame error rate detector for detecting a number of frame errors of said data signal and for outputting a frame error rate;

a summing node for determining a difference between said frame error rate and a frame error rate target to produce a frame error rate error;

a multiplier for multiplying said frame error rate error by a frame error rate to symbol error rate factor to produce a symbol error rate target error; and an other integration element to integrate said symbol error rate target error to produce said symbol error rate target.

11. A method of controlling a power output level of a mobile telecommunication system, comprising the steps:

a) receiving a signal transmitted by the telecommunication system;

b) detecting a symbol error rate of said transmitted signal;

c) subtracting said detected symbol error rate from a symbol error rate target to determine a symbol error rate error;

d) multiplying said symbol error rate error by a conversion factor to produce a signal power to noise power ratio error;

e) integrating said signal power to noise power ratio error to produce a signal power to noise power ratio target; and f) controlling the power output level of the mobile telecommunication system based on said signal power to noise power ratio target.

12. The method of claim 11, wherein step (f) comprises the steps of:

1) detecting a signal power to noise power ratio from said transmitted signal;

2) subtracting said detected signal power to noise power ratio from said signal power to noise power ratio target to determine said signal power to noise power ratio error;

3) multiplying said signal power to noise power ratio error by a conversion factor to determine a power control error; and 4) integrating said power control error to determine the power output level of the mobile telecommunication system.

13. The method of claim 11, further comprising the step:

g) adjusting said symbol error rate target based on frame error rate detection.

14. The method of claim 13, wherein step (f) comprises the steps of:

1) detecting a signal power to noise power ratio from said transmitted signal;

2) subtracting said detected signal power to noise power ratio from said signal power to noise power ratio target to determine said signal power to noise power ratio error;

3) multiplying said signal power to noise power ratio error by a conversion factor to determine a power control error; and 4) integrating said power control error to determine the power output level of the mobile telecommunication system.

15. The method of claim 13, wherein said frame error rate detection comprises the steps of:

1) detecting a frame error rate of said transmitted signal;

2) subtracting said detected frame error rate from a frame error rate target to determine a frame error rate error;

3) multiplying said frame error rate error by a frame error rate to symbol error rate factor to produce a symbol error rate target error; and 4) integrating said symbol error rate target error to produce said symbol error rate target.

* * * * *